United States Patent
Khair et al.

(10) Patent No.: US 7,062,905 B2
(45) Date of Patent: Jun. 20, 2006

(54) CONTROL METHOD FOR DUAL PATH NOX ADSORBER SYSTEM

(75) Inventors: Magdi K. Khair, San Antonio, TX (US); Harley D. Ferguson, III, Schertz, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 10/371,686

(22) Filed: Feb. 21, 2003

(65) Prior Publication Data
US 2004/0163383 A1  Aug. 26, 2004

(51) Int. Cl.
*F01N 3/00* (2006.01)

(52) U.S. Cl. ............. 60/295; 60/274; 60/285; 60/286; 60/287; 60/297

(58) Field of Classification Search ............ 60/274, 60/276, 285, 286, 287, 288, 295, 297, 301, 60/303, 311
See application file for complete search history.

(56) References Cited

U.S. PATENT DOCUMENTS

| | | | |
|---|---|---|---|
| 5,365,734 A * | 11/1994 | Takeshima | 60/288 |
| 5,910,097 A | 6/1999 | Boegner et al. | 60/278 |
| 6,082,100 A * | 7/2000 | Boegner et al. | 60/286 |
| 6,105,365 A * | 8/2000 | Deeba et al. | 60/295 |
| 6,134,883 A * | 10/2000 | Kato et al. | 60/276 |
| 6,170,259 B1 | 1/2001 | Boegner et al. | 60/286 |
| 6,367,246 B1 | 4/2002 | Hirota et al. | 60/295 |
| 6,742,328 B1 * | 6/2004 | Webb et al. | 60/285 |
| 6,779,339 B1 * | 8/2004 | Laroo et al. | 60/297 |
| 6,820,414 B1 * | 11/2004 | Stroia et al. | 60/286 |
| 6,843,054 B1 * | 1/2005 | Taylor et al. | 60/275 |
| 6,968,680 B1 * | 11/2005 | van Nieuwstadt et al. | 60/288 |

FOREIGN PATENT DOCUMENTS

CA  2235980  4/1998

* cited by examiner

*Primary Examiner*—Tu M. Nguyen
(74) *Attorney, Agent, or Firm*—Baker Botts L.L.P.

(57) ABSTRACT

A method of controlling a dual path NOx adsorber system. The amount of exhaust into the two paths of the system is controlled by a diverter valve at the beginning of each path. The valves are operated such that most of the time, the adsorbers are simultaneously in adsorption mode. The adsorbers alternate with each other to briefly enter a regeneration mode, during which they receive a very small amount of the exhaust flow and also receive supplemental fuel injection.

8 Claims, 1 Drawing Sheet

CONTROL METHOD FOR DUAL PATH NOX ADSORBER SYSTEM

TECHNICAL FIELD OF THE INVENTION

This invention relates to exhaust gas emission control for internal combustion engines, and more particularly to controlling nitrogen oxides using nitrogen oxide adsorbers.

BACKGROUND OF THE INVENTION

Today's conventional diesel engines produce nitrogen oxides ($NO_x$), which play a role in forming photochemical smog. Yet diesel engines are so durable, reliable, and efficient, it is important to keep them as viable options for transportation.

Increasingly strict regulations have prompted research for new ways of controlling the polluting emissions from diesel engines without compromising fuel economy. In the United States, Environmental Protection Agency rules require cleaner diesel fuel (lower sulfur content) and more stringent engine standards (reducing particulate matter and nitrogen oxide emissions).

Researchers have demonstrated that nitrogen oxide emissions can be reduced by exhaust recirculation in both gasoline and diesel engines. However, only a limited amount of exhaust can be recirculated without reducing power output and fuel economy. Recirculated soot particles may also cause wear in diesel engines. Other methods for NOx reduction that are being studied are fuel-water emulsion, selective catalytic reduction with ammonia or urea, lean NOx catalysts, and NOx adsorbers.

NOx adsorbers (NOx traps) are a promising development as results show that NOx adsorber systems are less constrained by operational temperatures than lean NOx catalysts. NOx traps adsorb and store NOx under lean conditions. A typical approach is to speed up the conversion of nitric oxide (NO) to nitrogen dioxide ($NO_2$) using an oxidation catalyst so that $NO_2$ can be readily stored as nitrate on alkaline earth oxides. A brief return to stoichiometric or rich operation for one or two seconds is enough to desorb the stored NOx and provide the conditions of a conventional three-way catalyst mounted downstream to destroy NOx.

One design for using NOx adsorber technology is referred to as a "dual leg" or "dual path" design. In these systems, the exhaust path splits into two paths, with a NOx adsorber on each new path. Typically, one path receives most of the exhaust flow while the other path is in regeneration mode. After regeneration, that path begins to receive most of the exhaust flow while the other path regenerates. The paths continually switch modes in this manner.

DETAILED DESCRIPTION OF THE INVENTION

Figure 1:
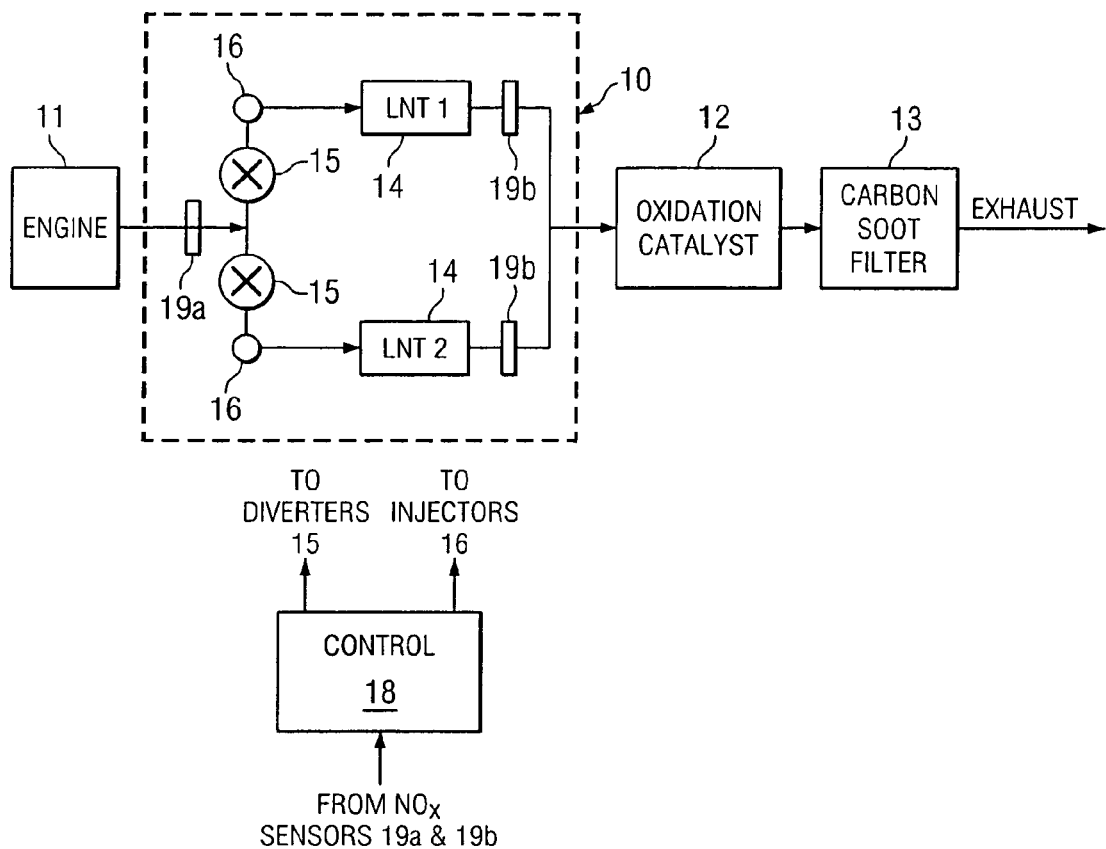
FIG. 1 illustrates a dual path NOx adsorber system in accordance with the invention.

FIG. 1 illustrates a dual path NOx adsorber system 10 in accordance with the invention. Engine 11 is assumed to be a diesel internal combustion engine, but the invention could be modified for other types of engines that use NOx adsorption for treating exhaust.

Exhaust is exhausted from engine 11 into dual path NOx adsorber system 10, which is described below. In the example of this description, system 10 is immediately downstream of engine 11. An oxidation catalyst (OC) 12 and a carbon soot filter (CSF) 13 are downstream of the NOx adsorber system 10.

In other embodiments of the invention, the arrangement of system 10 relative to any other exhaust treatment device(s) could be varied. Thus, oxidation catalyst 12 and/or carbon soot filter 13 could be upstream of system 10 rather than downstream, and other treatment devices could be placed upstream or downstream.

System 10 has two lean NOx traps (LNTs) 14, one on each path of system 10. NOx adsorber technology uses a three step process for the reduction of NOx. The first step is for the NO and excess $O_2$ in the exhaust gas to be chemically converted to NO2 over a platinum-based catalyst during lean engine operation. The second step is storing or adsorbing the NO2 as a nitrate on an site within a catalyst substrate. Before NO2 saturation is reached, the third step is to supply enough reductant (CO, HC, H2, etc) in the exhaust to maintain a rich operation long enough to chemically react the stored NO2 to produce nitrogen, water, and carbon dioxide. Various NOx adsorption devices could be used, with the common feature being NO2 saturation and the need for periodic regeneration (desorption).

Typically, each adsorber 14 has substantially equal adsorption capacity. As explained below, during engine operation, adsorbers 14 may be in either "adsorption mode" or "regeneration mode". In adsorption mode, each adsorber 14 receives exhaust appropriate for its relative adsorption capacity, typically one-half.

In adsorption mode, approximately one-half of the exhaust from engine 11 is directed to a first path of system 10 and the other half to the second path. When an adsorber 14 nears NO2 saturation, it enters regeneration mode.

Various means may be used to determine when adsorbers 14 require regeneration (by being saturated or by having reached a predetermined NOx conversion efficiency). In the example of FIG. 1, NOx sensor 19a is placed upstream of adsorbers 14 (and upstream of valves 15) and NOx sensors 19b are placed immediately downstream of adsorbers 14. Sensors 19a and 19b sense the NOx content of the exhaust and deliver a signal to control unit 18. Control unit 18 processes the sensor signals to determine NOx conversion efficiency. This parameter is used to determine when regeneration is required. Control unit 18 may be part of a more comprehensive engine control unit.

NOx sensors 19a and 19b allow NOx conversion efficiency (CE) to be calculated as follows:

$$CE = ((\text{upstream } NOx - \text{downstream } NOx)/\text{upstream } NOx))(100)$$

This calculation is performed in control unit 18, and can be used to maintain the NOx conversion efficiency at a predetermined rate, such as 95%. The desired efficiency determines the regeneration frequency. The adsorbers are regenerated prior to being saturated, so as to avoid NOx breakthrough.

Regeneration is accomplished by restricting the flow down the path being regenerated to approximately five percent or less of the total exhaust flow from engine 11. During regeneration, the remainder of the flow is directed to the second path. Diverter valves 15 are used for this purpose.

During regeneration, the regenerating path receives supplemental diesel fuel injected into the exhaust stream upstream from adsorber 14. One of the injectors 16 is used for this purpose. The fuel injection is sufficient so as to achieve an air-fuel ratio of $0.6<\lambda<0.8$ for a period of time less than ten seconds. Other regeneration methods could be used, alternatively or in addition to supplemental fuel injection, such as intake throttling and/or exhaust gas recirculation (EGR).

At completion of the regeneration period for the first path, valves 15 are activated so as to again direct the exhaust in equal amounts to both paths of system 10. Thus, both adsorbers 14 are again in adsorption mode. Shortly thereafter, the second path is regenerated using the same scheme as described above for regeneration of the first path. That is, the exhaust flow is reduced and supplemental fuel is injected. At completion of regeneration of the second path, the valves 15 are activated to once again direct the exhaust in equal amounts to both paths. System 10 remains in this state until the next regeneration cycle occurs.

Figure 2:
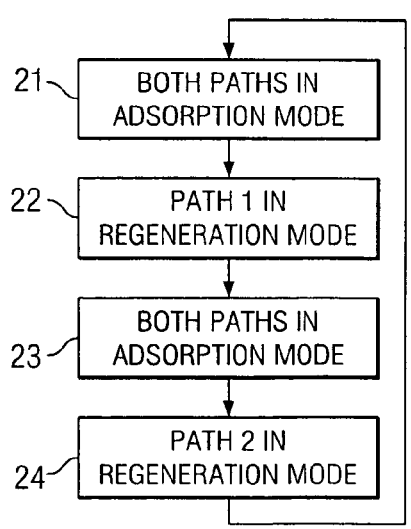
FIG. 2 illustrates a method of controlling a dual path NOx adsorber system in accordance with the invention.

FIG. 2 further illustrates the method of controlling system 10. For purposes of example in FIG. 2, it is assumed that adsorbers 14 are to be regenerated approximately on a cycle of less than 5 minutes. Normally, a lean-to-rich exhaust condition is 30/3, which means that that NOx adsorbers 14 run 3 seconds rich for every 30 seconds of lean operation.

As illustrated, in Step 21, both paths are in adsorption mode for a period of less than 5 minutes. Each path receives an appropriate amount of exhaust, which is typically one-half the exhaust where adsorbers 14 are of the same capacity. Then, in Step 22, a first path is placed in regeneration mode, receiving approximately 5% or less of the exhaust. The remainder of the exhaust is directed to the second path while the first path is in regeneration mode. As stated above, the regeneration mode is of brief duration, for example, 10 seconds. In Step 23, both paths are again placed in adsorption mode, each receiving its fair share of exhaust. In the example of FIG. 2, this second adsorption mode is very brief. In Step 24, the second path is placed in regeneration mode, and receives approximately 5% or less of the exhaust while in that mode.

It should be understood that the durations of the adsorption and regeneration modes may vary and that various timing and sensing schemes could be used to control the duration of each mode. For example, experimentation may reveal that a particular frequency of regeneration is optimum. It is also conceivable that Step 23 could be omitted, such that the second path is regenerated immediately after the first path and such that the two paths are simultaneously in adsorption mode only during Step 21.

The method described above can be implemented with a control unit 18, which contains a processor and appropriate memory. Control unit 18 is programmed to generate appropriate control signals to diverter valves 15 and injectors 16. It may receive signals from NOx sensors 19a and 19b to determine when regeneration is required, or as discussed below, may include timing means to determine when regeneration is to occur.

Alternatively, sensors 19a and 19b may determine the need for regeneration by sensing NOx "breakthrough" past adsorbers 14. If regeneration fails to revive the adsorber 14, a desulfurization process may be required. This occurs when sulfur from fuel or oil occupies the catalyst sites in the adsorber and denies them to NOx. Desulfurization may be accomplished thermally by heating the adsorber.

As a result of the above-described regeneration method both adsorbers 14 are in use during the adsorption period. They are adsorbing in unison, and regenerating successively for brief alternating periods. Both adsorbers are together in adsorption mode substantially longer than the time they are in regeneration mode. For example, if the total regeneration time for both adsorbers 14 was 5 seconds per cycle, they would be in adsorption mode and receiving equal amounts of exhaust for much longer time per cycle.

This increases the overall capacity of system 10 to adsorb NOx. In effect, the method reduces the space velocity of system 10 as compared to other dual path adsorber systems, where "space velocity" is defined as the maximum engine flow divided by the total NOx adsorber catalyst volume. The residence time for NOx adsorption is increased, and the overall NOx reduction is improved. Experimentation has been successful with an adsorber-to-engine-displacement ratio of 2.9:1.

System 10 provides satisfactory NOx reduction without the use of exhaust gas recirculation. Thus, the durability of modern diesel engines is not compromised by recirculated exhaust. In addition, the reduced cost of the precious metal required to construct the adsorbers makes the above-described system even more attractive.

Other Embodiments

Although the present invention has been described in detail, it should be understood that various changes, substitutions, and alterations can be made hereto without departing from the spirit and scope of the invention as defined by the appended claims.

What is claimed is:

1. A method of controlling regeneration of NOx adsorbers in a dual path NOx adsorber system that treats exhaust during operation of an internal combustion engine, comprising the steps of:
   directing substantially equal amounts of the total exhaust into each path of the adsorber system, such that each adsorber is in adsorption mode simultaneously, with each path receiving a substantially half proportion of the exhaust;
   determining when the adsorber on a first path is to be regenerated;
   in response to the determining step, limiting the flow of exhaust to approximately 5% or less to the first path and directing the remaining flow to the second path, such that the first path receives a low proportion of the exhaust and the second path receives a high proportion of the exhaust;
   regenerating the adsorber in the first path, such that the dual path NOX adsorber system is in a first path regeneration mode;
   limiting the flow of exhaust to approximately 5% or less to the second path and directing the remaining flow to the first path, such that the second path receives a low proportion of the exhaust and the first path receives a high proportion of the exhaust;
   regenerating the adsorber in the second path, such that the dual path NOx adsorber system is on a second path regeneration mode; and
   repeating the above steps, such that both adsorbers are in adsorption mode substantially longer than in regeneration mode, and such that during operation of the engine, each path receives three periodically repeating exhaust flow conditions, each exhaust flow condition having a different proportion of the total exhaust as follows: a substantially half proportion during adsorption on that path, a low proportion during regeneration on that path, and a high proportion during adsorption on that path.

2. The method of claim 1, further comprising the steps, after regenerating the adsorber in the first path, of again directing substantially equal amounts of exhaust into each path of the adsorber system; determining when the adsorber on a second path is to be regenerated; and wherein the step of limiting the flow of exhaust to the second path is performed in response to the determining step.

3. The method of claim 1, wherein the directing steps are performed by valves, one at the beginning of each path.

4. The method of claim 1, wherein the determining steps are performed by sensing NOx downstream of the adsorbers.

5. The method of claim 1, wherein the determining steps are performed by timing the duration of time the adsorbers are in adsorption mode.

6. The method of claim 1, wherein the duration of the regeneration mode is approximately 10 seconds or less.

7. The method of claim 1, wherein the regenerating step is performed by injecting supplemental hydrocarbon fuel into the path being regenerated, upstream of the adsorber.

8. The method of claim 7, wherein the supplemental hydrocarbon fuel results in a relative air-fuel ratio between 0.6 and 08.

\* \* \* \* \*